United States Patent [19]

Loker et al.

[11] 4,204,589
[45] May 27, 1980

[54] SHAFT DECOUPLING DEVICE

[75] Inventors: W. Aleck Loker, Leonardtown; Jon L. Bortzfield, Great Mills; Steven D. Chard; John W. Hall, both of Lusby; John T. Meredith, Lexington Park, all of Md.

[73] Assignee: The United States of America as represented by the Secretary of the Navy, Washington, D.C.

[21] Appl. No.: 931,348

[22] Filed: Aug. 7, 1978

[51] Int. Cl.² ............................................. F16D 3/34
[52] U.S. Cl. ...................................... 192/27; 64/28 R; 192/38; 403/2; 403/335
[58] Field of Search .................. 192/27, 38, 44, 45, 192/12 B, 55, 56 R, 67 P, 71, 108; 74/162; 188/82.84; 64/28 R, 9 R, 9 A, 14, 16; 403/2, 335, 337

[56] References Cited

U.S. PATENT DOCUMENTS

| 2,291,151 | 7/1942 | Dunn | 192/38 |
| 2,989,160 | 6/1961 | Woodruff | 192/38 X |
| 3,108,670 | 10/1963 | Habicht | 192/27 |
| 3,412,620 | 11/1968 | Bloom et al. | 192/27 X |
| 3,487,900 | 1/1970 | Dahl | 192/27 X |
| 3,504,776 | 4/1970 | Misenti | 192/55 |
| 3,747,196 | 7/1973 | Whittington | 403/2 X |
| 3,927,537 | 12/1975 | Anderson et al. | 64/28 R |
| 3,958,629 | 5/1976 | Tamarin | 192/27 X |
| 4,055,967 | 11/1977 | Terranova et al. | 64/28 R |
| 4,086,012 | 4/1978 | Buckley et al. | 64/28 R X |

Primary Examiner—C. J. Husar
Assistant Examiner—Moshe I. Cohen
Attorney, Agent, or Firm—Harvey A. David; Richard S. Sciascia

[57] ABSTRACT

A shaft decoupler wherein driving and driven components having grooved flanges are keyed together by rollers held in the grooves by lands between recesses of a retaining assembly that normally rotates with the mentioned components and is momentarily arrested to allow the driving and driven components to advance the roller carrying grooves to alignment with the recesses to effect decoupling. The decoupler is characterized by the use of high strength plastic rollers, cooperating indexing elements to limit relative rotation between the driving component and the retaining assembly, and a solid lubricant filled plastic thrust and journal bearing.

12 Claims, 5 Drawing Figures

SHAFT DECOUPLING DEVICE

BACKGROUND OF THE INVENTION

This invention relates to rotary shaft decoupling devices and more particularly to an improved shaft decoupler device of the type that can be actuated to rapidly decouple a driven apparatus, such as a generator, from its prime mover.

While not limited thereto, the present invention finds application in association with aircraft generators wherein it is desirable for the flight engineer to be able to positively decouple a generator from the aircraft engine, and to be assured that recoupling will not occur. Heretofore, a shaft decoupler has been used that compirsed a grooved input component, an axially aligned grooved output component, a plurality of cylindrical keys or rollers, and an outer component or retainer. The rollers are normally held in the grooves of the driving and driven components by the outer component or retainer and the entire combination rotates as a unit. Upon actuation, a plunger engages a pin on the periphery of the outer component, momentarily arresting its rotation and allowing the driving and driven components to index to a position relative to the outer component where the grooves and rollers align with recesses in the outer component. Radial restraint on the rollers is thereby relieved and the rollers move from the grooves into the outer component recesses where they are held by centrifugal force. The driving and driven components are thereby freed for relative rotation and the generator is no longer driven.

Although all of the force transmitting decoupler components have been formed of high strength steel and thrust and journal bearings of brass or bronze, all carefully selected for proper fit, finish, and material hardness, the components have been subject to severe and rapid fretting wear and failure. Frequently during service the shaft decoupler components became so inhibited due to wear and the build-up of fretting corrosion deposits that the decoupler failed to actuate when required. In other cases wear progressed to the extent that the decoupler actuated unintentionally. The wear occurs due to the cyclic loading of the generator which produces torsional oscillations in the coupling, and also due to axial and flexural stresses imposed by misalignment inherent in the generator gearbox installation.

Another problem that has been encountered with existing decouplers of the foregoing type has been that of inadvertent resetting, or engagement, of the decoupler, as has resulted on the occasion of reverse rotation of the driving shaft component within the outer component and a resultant deposition of two rollers in one recess, the two rollers jamming and effecting a driving situation.

SUMMARY OF THE INVENTION

With the foregoing in mind, it is a principal object of this invention to provide an improved rotary shaft decoupling device, useful for transmitting and interrupting driving power between a prime mover and a driven apparatus, which device avoids most or all of the disadvantages and shortcomings of the prior art decoupling devices.

Another object of this invention is the provision of a shaft decupler that is capable of transmitting high rotational loads between axially aligned driving and driven shafts or components, and is actuable to rapidly and positively effect a decoupling of said shafts.

As another object the invention aims to provide a shaft decoupling device that is considerably more durable and reliable in operation than prior devices.

Yet another object is to provide a shaft decoupling device of the foregoing character that is inexpensive to manufacture and to maintain, and which requires a minimum of highly finished, close tolerance, carefully hardened metal parts.

Still another object is the provision of a single actuation shaft decoupling device that, once actuated, will not inadvertently reengage irrespective of changes in direction of shaft rotations.

A further object is to provide a shaft decoupling device that accomplishes the foregoing through novel combinations, arrangements of parts and usages of materials.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
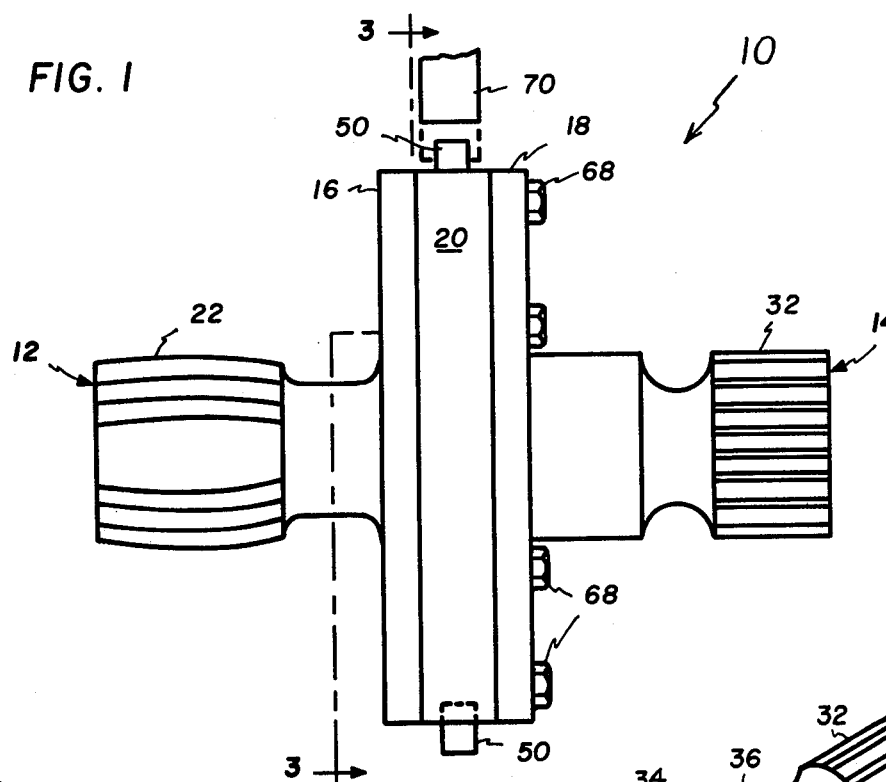
FIG. 1 is a side elevational view of a shaft decoupling device embodying the present invention.
Figure 2:
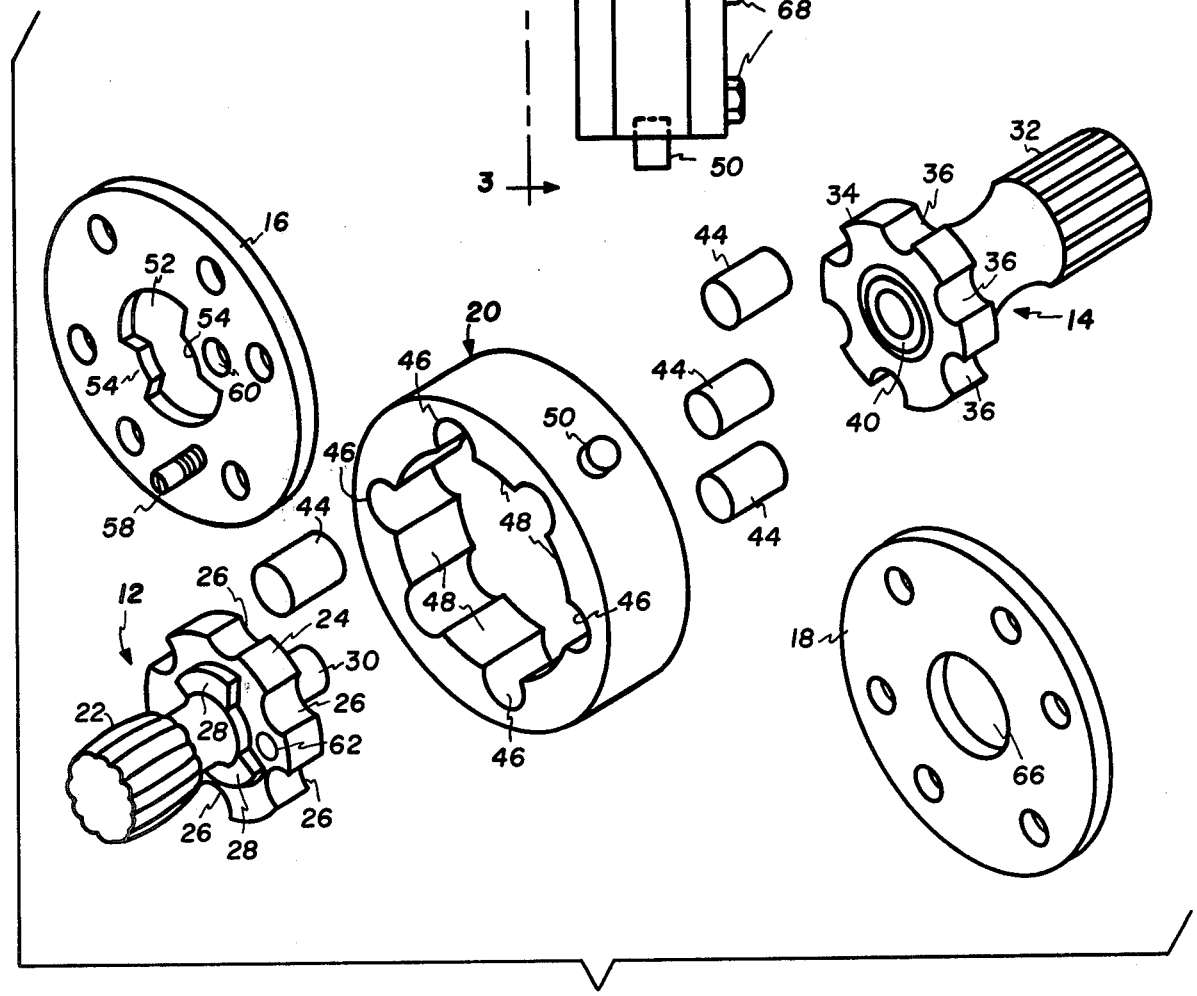
FIG. 2 is an exploded view illustrating the principal parts of the device of FIG. 1.

In the exemplary form of the invention illustrated in the drawings and described hereinafter, a rotary shaft decoupling device is indicated generally at 10 and comprises an input or driving component 12, and output or driven component 14, and an outer or retaining assembly including circular end plates 16, 18 and a central retainer component 20. The driving component 12, comprises a splined portion 22 for connection to a rotational prime mover, this splined portion advantageously being of the type described in U.S. Pat. No. 3,620,043. As is best shown in FIG. 2, the driving component 12 further comprises a drive flange portion 24 having a plurality, namely six, of arcuate grooves 26 evenly spaced about the periphery thereof, a pair of indexing lobes 28, and an axially extending stub shaft or journal 30.

The driven component 14 comprises a splined portion 32 for connection to a driven apparatus, a driven flange portion 34 having six evenly spaced arcuate grooves 36 in the periphery thereof, and carries a thrust and journal bearing 40, adapted to cooperate with the driving flange 24 and journal 30 and later described in more detail. The driving and driven components 12 and 14 are preferably formed of steel.

Figure 4:
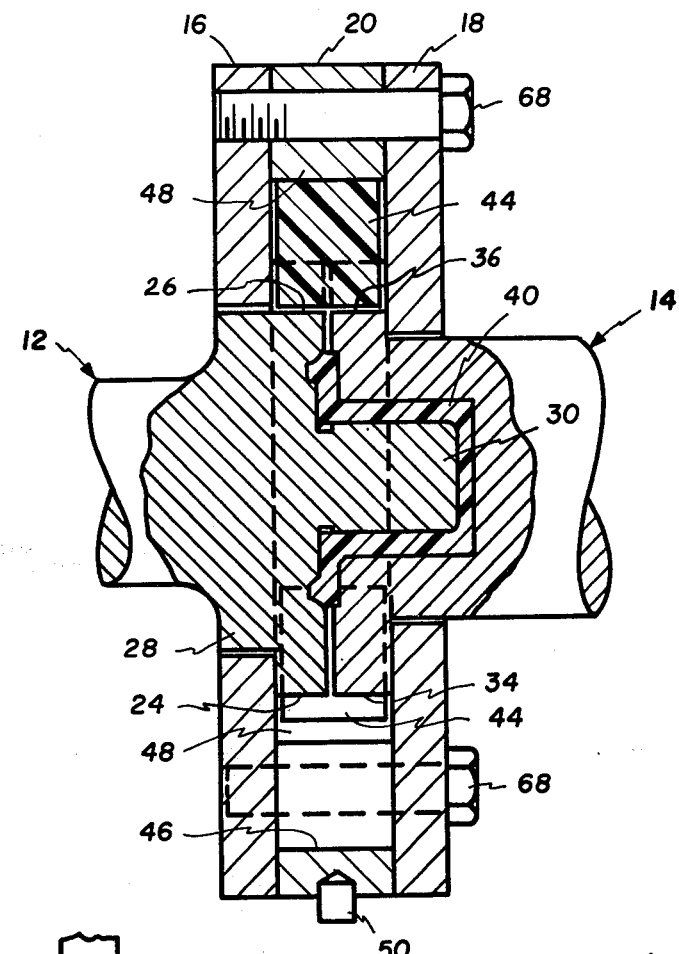
FIG. 4 is an enlarged sectional view taken substantially along line 4—4 of FIG. 3.

A plurality of six key elements, in the form of cylindrical plastic rollers 44, are adapted to be seated in aligned grooves 26, 36 of the driving and driven flange portions 24, 34, respectively, and serve to key the driving and driven components together during those times when the decoupling device 10 is operating to transmit rotational driving forces. As is best seen in FIG. 4, the rollers 44 substantially span the flange portions 24, 34 which are in face to face relation.

Figure 3:
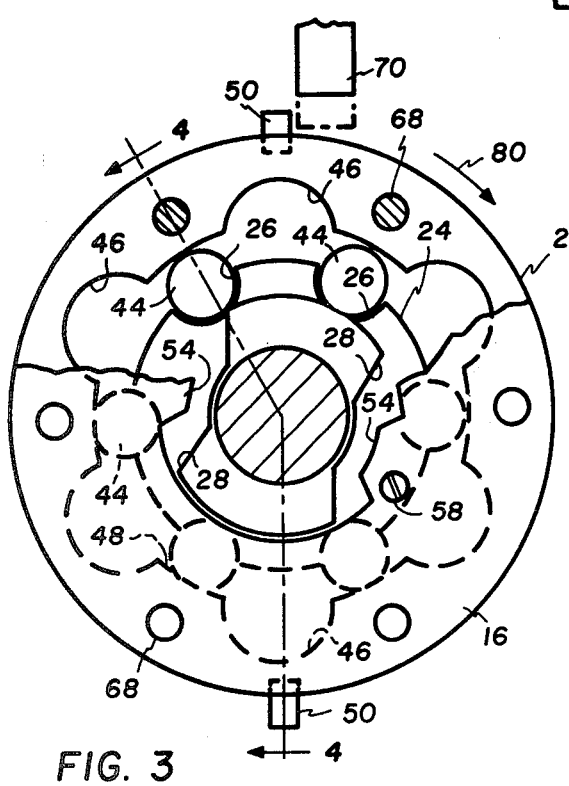
FIG. 3 is a sectional view of the device taken substantially along line 3—3 of FIG. 1.

The outer or retainer component 20, also preferably formed of steel, comprises an annulus the inner surface of which is relieved with a plurality of arcuate recesses 46, corresponding in number and spacing to the grooves 26, 36 of the driving and driven component flange portions 24, 34. A like plurality of lands 48 project radially inwardly of the retainer component 20. As is best seen in FIGS. 3 and 4 wherein the device 10 is in its force transmitting operative condition, the rollers 44 are held in the aligned grooves 26, 36 by the lands 48 of the component 20. The component 20 further comprises a pair of shearable, diametrically located pins 50 extending radially therefrom and for a purpose which will become apparent as this specification proceeds.

The end plate 16 of the outer or retaining assembly has a central aperture 52 into which project a pair of indexing lugs 54 adapted to cooperate with the indexing lobes 28 of the driving component 12 to limit relative rotation of the driving component with respect to the retainer assembly to an angular amount in either direction corresponding to one half of the angular spacing of the recesses 46. That is, 30° in this embodiment. This feature is important in preventing inadvertent reengagement in the event of reverse rotation of components subsequent to a decoupling operation.

The size of the aperture 52 and lugs 54 is such as to permit passage of the splined portion 22 during assembly. A shearable indexing screw 58 extends through an opening 60 in the end plate 16 and threads into a bore 62 in the flange portion 24 to yieldably hold the parts in the positions illustrated in FIGS. 3 and 4.

The end plate 18 has a central aperture 66 adapted to pass the splined portion 32 and is secured in assembly with the retainer component 20 and end plate 16 by a plurality of cap screws 68.

A plunger or stop element 70 is adapted to be advanced, from a normal non-interfering position illustrated in full lines, to the dot and dash line position in the path of the pins 50. The plunger 70 may be actuated mechanically or by electrical solenoid in order to initiate a decoupling operation.

It should be noted at this point that the plastic key elements or rollers 44 are formed of a plastic material having a high resistance to wear and deformation, even under extreme temperature and stress conditions. Moreover, there is a complete absence of fretting of either the rollers, the driving and driven components 12, 14 or the retainer 20. Plastic or non-metallic materials that have been found suitable for this use include those known as polyimides, aramids, and other thermoplastics. More specifically, in decoupling devices of this preferred embodiment, roller elements 44 have been formed of polyimide plastic sold by Dupont Corporation under the trade name "VESPEL" and further identified as their VESPEL SP-1 and VESPEL KS-105. A suitable aramid plastic is sold by Amoco, Inc. under the trade name "TORLON." The use of such materials as the key elements in the above described combination has provided a marked increase in useful life of the device by substantially eliminating galling, fretting, and fretting corrosion products.

It should further be noted, as an important feature of the invention that the combined thrust and journal bearing 40, which is of a hat shaped section best shown in FIG. 4, is formed of a solid lubricant filled plastic material. In the exemplary embodiment being described that material comprises a particulate graphite containing polyimide plastic such as those sold under the names "VESPEL SP-21" or "VESPEL SP-22." The use of such a bearing material, in place of the usual liquid lubricant filled porous bronze has been important to the capability of the decoupling device 10 to serve as a free wheeling coupling, after a decoupling event, without damage to the various components.

MODE OF OPERATION

With the various parts in the operating positions illustrated in FIGS. 3 and 4, the device 10 functions as a direct drive from input to output. In this condition, the indexing screw normally holds the driving component 12 fixed against rotation relative to the retaining assembly of end plates 16, 18 and retainer 20, the lands 48 of which hold rollers 44 in engagement with the grooves 26 and 36. As a result, the entire device rotates as a unit in the direction of the arrow 80.

Figure 5:
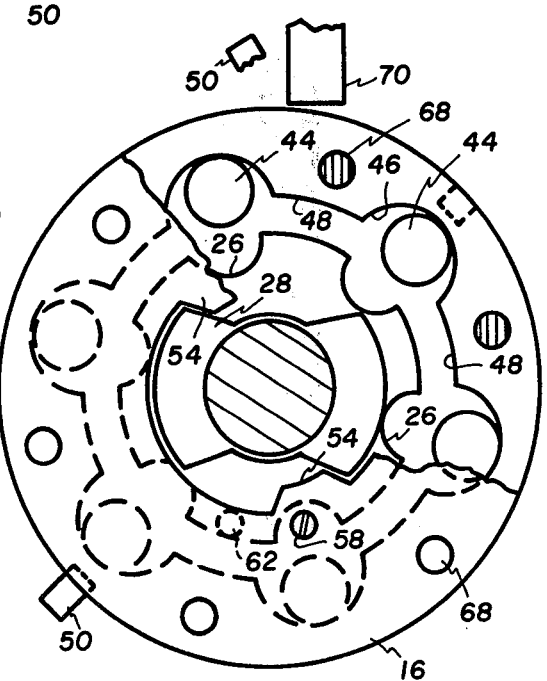
FIG. 5 is a view similar to FIG. 3 but shows parts in different operative positions.

Now, actuation of the plunger 70 into the path of travel of pins 50 will result in momentary arresting of the rotation of the retainer 20 and end plates 16 and 18 as the first pin 50 strikes the plunger. Rotation of the driving and driven components 12 and 14 will, however, continue, shearing the indexing screw 58. It should be noted at this point that screw 58 is more prone to shear than are the pins 50. The continued rotation of the driving and driven components 12 and 14 relative to the arrested retaining assembly will bring the roller carrying grooves 26 and 36 thereof, into radial alignment with the recesses 46 of the retainer 20 as shown in FIG. 5, thereby relieving the rollers 44 of the radial restraint of lands 48 of the retainer and permitting the rollers to leave the grooves and move outwardly under centrifugal force into the respective recesses 46. At that time the indexing lobes 28 will engage the lugs 54 of end plate 16 and the retaining assembly will again begin to rotate with the driving component 12, the first pin 50 being sheared by the plunger 70 as the retaining assembly rotation is picked up. Because the rollers are thereafter held by centrifugal force in the recesses 46 and out of engagement with the grooves 26, 36, the heretofore driven component 14 is rotationally decoupled from the driving component 12, and free wheels.

In the case where the decoupler 10 interconnects a prime mover and a generator, for example, the generator and the driven component 14 will decelerate due to friction, windage, and any other loads. After 180° of rotation following shearing of the first pin 50, the second pin 50 will also be sheared.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:
1. A rotary shaft decoupling device comprising:
a driving component having a plurality of equally spaced, axially extending peripheral first grooves;
a driven component disposed in axial alignment with said driving component and having a like plurality of equally spaced, axially extending peripheral second grooves;

a like plurality of rollers disposed in said grooves in spanning relation between said driving and driven components so as to key said components together for common rotation;

retaining means encircling said rollers and components and operative in a first relative rotative position between said grooves and said retaining means to hold said rollers in said grooves;

said retaining means being operative in a second relative rotative position between said grooves and said retaining means to release said rollers from said grooves;

first indexing means for yieldably connecting said retaining means to said driving component for rotation therewith in said first relative rotative position;

yieldable stop means for arresting rotation of said retaining means and causing said first indexing means to yield to continued rotation of said driving and driven components, whereby said grooves are advanced in rotation relative to said retaining means into said second position;

second indexing means, responsive to obtaining of said second relative rotative position, for causing said stop means to yield and said retaining means to again rotate with said driving component; and said rollers being characterized as being formed of a synthetic plastic materials.

2. A device as defined in claim 1 wherein:
one of said driving and said driven components comprises a stub shaft, a combined journal bearing and thrust bearing carried by the other of said components and receiving said stub shaft; and said combined journal bearing and thrust bearing being formed of a solid lubricant filled synthetic plastic.

3. A device as defined in claim 1, and wherein:
said second indexing means comprises cooperating lobe and lug means on said driving component and said retaining means, said lobe and lug means being operative to limit relative rotation between said driving component and said retaining means, said lobe and lug means being operative to limit relative rotation between said driving component and said retaining means to an angular displacement in at least one direction equal to one half the angular spacing between said first grooves.

4. A device as defined in claim 1, and wherein:
said synthetic plastic material comprises a polyimide plastic.

5. A device as defined in claim 1, and wherein:
said plastic material comprises an aramid plastic.

6. A device as defined in claim 1, and wherein:
said first indexing means comprises a shearable connection between said retaining means and said driving component.

7. A device as defined in claim 6 and wherein:
said second indexing means comprises cooperating lobe and lug means on said driving component and said retaining means, said lobe and lug means being operative to limit relative rotation between said driving component and said retaining means, said lobe and lug means being operative to limit relative rotation between said driving component and said retaining means to an angular displacement in at least one direction equal to one half the angular spacing between said first grooves.

8. A device as defined in claim 7, and wherein:
said yieldable stop means comprises a shearable pin extending from said retaining means and plunger means movable into the path of said shearable pin, said shearable pin having a greater resistance to shearing than said first indexing means.

9. A device as defined in claim 8, and wherein:
one of said driving and said driven components comprises a stub shaft, a combined journal bearing and thrust bearing carried by the other of said components and receiving said stub shaft; and said combined journal bearing and thrust bearing being formed of a solid lubricant filled synthetic plastic.

10. A device as defined in claim 9, and wherein:
said lubricant filled plastic material comprises particulate graphite in a polyimide plastic.

11. A device as defined in claim 9, and wherein:
said solid lubricant filled plastic material comprises particulate graphite in an aramid plastic.

12. A device as defined in claim 9, and wherein said retaining means comprises:
an annulus the inner surface of which comprises a plurality of radial recesses corresponding in number the said plurality of rollers and a plurality of lands facing inwardly;

said lands being operative in said first position to prevent outward movement of said rollers from said grooves, and said recesses being operative in said second position to receive said rollers when moved outwardly from said grooves by centrifugal force.

* * * * *